United States Patent
Kalyani (10) Patent No.: US 9,446,445 B2
(45) Date of Patent: Sep. 20, 2016

(54) METHOD FOR MANUFACTURING HOLLOW SHAFTS

(71) Applicant: Babasaheb Neelkanth Kalyani, Pune (IN)

(72) Inventor: Babasaheb Neelkanth Kalyani, Pune (IN)

(73) Assignee: Bharat Forge Ltd., Maharashtra (IN)

( * ) Notice: Subject to any disclaimer, the term of this patent is extended or adjusted under 35 U.S.C. 154(b) by 0 days.

(21) Appl. No.: 14/369,206

(22) PCT Filed: Dec. 27, 2012

(86) PCT No.: PCT/IB2012/057749
§ 371 (c)(1),
(2) Date: Jun. 27, 2014

(87) PCT Pub. No.: WO2013/098771
PCT Pub. Date: Jul. 4, 2013

(65) Prior Publication Data
US 2015/0050513 A1    Feb. 19, 2015

(30) Foreign Application Priority Data

Dec. 30, 2011  (IN) .......................... 3714/MUM/2011

(51) Int. Cl.
| | |
|---|---|
| *B21J 5/08* | (2006.01) |
| *B21K 1/06* | (2006.01) |
| *B21J 5/00* | (2006.01) |
| *B21J 5/10* | (2006.01) |
| *B21C 1/00* | (2006.01) |
| *C21D 8/10* | (2006.01) |
| *C22F 1/10* | (2006.01) |

(Continued)

(52) U.S. Cl.
CPC ................ *B21K 1/063* (2013.01); *B21C 1/00* (2013.01); *B21J 5/002* (2013.01); *B21J 5/08* (2013.01); *B21J 5/10* (2013.01); *C21D 8/105* (2013.01); *C22F 1/10* (2013.01); *C22F 1/183* (2013.01); *F03D 11/02* (2013.01); *F03D 15/00* (2016.05); *Y10T 428/12292* (2015.01)

(58) Field of Classification Search
CPC ........... B21K 1/06; B21K 1/063; C22F 1/10; C22F 1/183; C21D 8/10; C21D 8/105; B21J 1/04; B21J 5/08; B21J 5/10; B21J 5/002
See application file for complete search history.

(56) References Cited

U.S. PATENT DOCUMENTS

| | | | | |
|---|---|---|---|---|
| 2,064,323 | A * | 12/1936 | Schmidt ................ | B21C 23/001 428/577 |
| 3,313,138 | A * | 4/1967 | Spring ....................... | B21J 5/00 148/670 |
| 3,844,155 | A * | 10/1974 | Bew ........................ | B23P 17/00 72/356 |

(Continued)

FOREIGN PATENT DOCUMENTS

| | | | |
|---|---|---|---|
| DE | 10 2010 012717 A1 | 12/2010 | |
| EP | 1477248 A2 * | 11/2004 | ............... B21J 5/08 |

(Continued)

*Primary Examiner* — Edward Tolan
(74) *Attorney, Agent, or Firm* — Andrus Intellectual Property Law, LLp (57) ABSTRACT

The present invention describes a method of manufacturing a near-net shaped hollow shaft useful for high power applications such as gearboxes for wind energy industry. The method involves providing a concast bloom (of a round or rectangular or of any polygonal cross section) or an as-cast round ingot from which a hollow perform is prepared using hollow die punching, followed by process of heat treatment, proof-machining and stress relieving.

9 Claims, 5 Drawing Sheets

(51) Int. Cl.
  *C22F 1/18* (2006.01)
  *F03D 11/02* (2006.01)

(56) References Cited

U.S. PATENT DOCUMENTS

| | | | | |
|---|---|---|---|---|
| 5,374,323 A | * | 12/1994 | Kuhlman | B21J 1/06 148/409 |
| 7,171,837 B2 | * | 2/2007 | Yamanaka | B21C 23/205 72/325 |
| 8,047,042 B2 | * | 11/2011 | Sato | B21J 1/04 72/352 |
| 8,613,818 B2 | * | 12/2013 | Forbes Jones | C22C 14/00 148/649 |
| 8,800,335 B2 | * | 8/2014 | Kang | B21H 1/06 72/107 |
| 2004/0025560 A1 | * | 2/2004 | Funakoshi | B21C 1/26 72/358 |
| 2005/0091832 A1 | | 5/2005 | Ganesh et al. | |

FOREIGN PATENT DOCUMENTS

| | | |
|---|---|---|
| EP | 1500443 A1 | 1/2005 |
| JP | 2007 054840 A | 3/2007 |

* cited by examiner

METHOD FOR MANUFACTURING HOLLOW SHAFTS

FIELD OF INVENTION

The present invention relates to hollow shafts, and more particularly to a method for designing and manufacturing of hollow shafts from solid blooms or ingots such that it results in more effective utilisation of raw material and enhancement of mechanical properties and performance of the shafts thus produced.

BACKGROUND OF INVENTION

Hollow shafts are required in many industries. Most manufacturers of hollow shafts use boring techniques to form the annular bores of the hollow shafts.

Many industries including the wind energy industry use hollow shafts. These hollow shafts which are used in gear boxes are typically subjected to high static and dynamic loads.

For many decades these components have been manufactured using conventional manufacturing process where continuously cast (concast) bloom or cast ingot is subjected to forging process which results into forged bars followed by proof machining, heat treatment and final machining.

However, Conventional manufacturing method results into large machining time and poor yield. This results into substantial raw material wastage during mass production.

The existing method of manufacturing these parts are using cast polygonal/round ingot or bloom with no or minimal hot working as input. The machining includes OD turning, finishing, facing; deep hole drilling; boring, counter boring followed by heat treatment and final machining.

In a nutshell, the existing manufacturing method is a combination of forming a forged bar from a concast bloom or an as-cast ingot followed by machining. It has been found that the existing process results in about 50% utilization of material (thereby leading to about 50% wastage of material from the time of forming a bloom/ingot to making of the proof machined part).

The manufacturing of hollow shaft related inventions are reported in prior art. It is mentioned hereunder.

United States patent US20030221514A1 discloses a method of manufacturing hollow shaft with power transmission members such as cam of camshaft, crown gears of gear shaft or journals of crankshaft disposed one behind the other in an axial direction, the power transmission members being configured to be at least hollow.

U.S. Pat. No. 6,062,116 discloses method of manufacturing hollow shaft and mandrel for holding cylindrical hollow shaft blank. Hollow shaft is manufactured by defining a through hole axially in a shaft blank to produce a cylindrical hollow shaft blank, inserting a mandrel in the through hole of the hollow shaft blank, holding opposite ends of the mandrel concentrically with the through hole, and rotating the hollow shaft blank about its own axis while cutting an outer circumferential surface of at least one end of the hollow shaft blank concentrically with the through hole to form a reference outer circumferential surface on the at least one end of the hollow shaft blank.

U.S. Pat. No. 4,425,774 discloses an apparatus for extrusion forging essentially comprises a double action hydraulic press composed of an inner ram. Extrusion forging of a billet is accomplished by placing the billet in a container and inserting a punch into the container thereby forcing the billet through the die. After the extrusion forging, the punch is raised to a prescribed level and held there and the container is subsequently raised. Since the non-deformed part of the billet is attached fast to the container, the rising container drags the extruded part of the billet out of the die and, at the same time, brings the non-deformed part of the billet into powerful collision with the punch and consequently knocks the extrusion forged product out of the container.

U.S. Pat. No. 4,803,880 discloses a process for forging hollow elongated articles from super alloys and titanium alloys. The process employs preconditioned material which has low strength and high ductility. The process is performed in a forging press and has an initial step which converts a preform into an intermediate shape by press motion which produces radial outward work piece flow. Press punch geometry is then changed and the operation continues with radial inward flow about a mandrel.

U.S. Pat. No. 7,360,388B2 discloses a hollow stepped article is formed from a solid blank to reduce the material cost, and cracking is prevented in a stepped portion of large diameter when a portion of the blank is deformed by its radial expansion. A hollow stepped shaft is formed by holding an upper and a lower part axially of a solid rod-like blank with an upper and a lower die, respectively, which have a stepped recess of large diameter in a region where they are opposed to each other; compressing the blank from both its axially opposite sides with an upper and a lower punch each of which is smaller in diameter than the blank, thereby extruding the blank so that an axial hollow is formed therein about its axis in each of its upper and lower parts and that a portion of the blank opposed to the stepped recess of large diameter expands in diameter and deforms into that recess while leaving a solid plug-like portion between the punches; and thereafter further compressively moving one of the punches to shear the solid plug-like portion and force it out of the blank, whereby the blank is formed with a stepped portion of large diameter by radially expanding deformation in a region intermediate between its opposed ends or at one of these ends and with a continuous axial hollow about its axis.

The critical review of the prior art reveals following technological gaps such as, lack of manufacturing process modification, lack of machining work optimization, lack of material utilization, lack of virtual manufacturing technique implementation for process optimization of hollow shafts.

With conventional manufacturing method, which results into large machining time and poor yield, substantial raw material is thus wasted during mass production of such components.

Moreover, existing methods, which involve either no reduction or minimal reduction by hot working, do not result in superior material properties required for deployment in high power applications.

Another important limitation of the existing methods arises from the fact that the hollow shafts under consideration have steps in the bore involving multiple diameters. It is known that such multiple-stepped bores can be produced by machining only and therefore cannot provide continuous grain flow along the contour of bore. This is one of the main reasons why the hollow shafts produced using the current methods lack superior grain flow characteristics and mechanical properties.

There is therefore a need to provide alternative methods of designing and manufacturing hollow shafts, involving near-net shape forging, which would result in superior grain flow characteristics and mechanical properties and result in more effective utilisation of raw material.

OBJECTS OF THE INVENTION

Accordingly, an object of the present invention is to provide a method of designing and manufacturing hollow shafts to be used in gearbox components deployed in wind energy applications.

Another object of the invention is to provide a method to optimize concast bloom or an as-cast round ingot to make it suitable for use in a near-net forging process. One other object of the invention is to provide a near-net shape forging process for manufacturing of hollow shafts so as to enhance utilisation of material from the forging to proof machining stages of manufacturing.

Yet another object of the invention is to provide forging die design for the near-net-shape forging process of the invention.

Yet another object of the invention is to provide hollow shafts of improved dense grain flow, and strength through forging followed by steps of normalising, hardening and double tempering prior to proof machining followed by stress relieving

LIST OF PARTS

1. Concast bloom or ingot
2. Central bore
3. Near-net shaped hollow shaft
4. Finished hollow shaft

SUMMARY OF THE INVENTION

The present invention describes a method of manufacturing a near-net shaped hollow shaft useful for high power applications such as gearboxes for wind energy industry. The method involves providing a concast bloom (of a round or rectangular or of any polygonal cross section) or an as-cast round ingot from which a hollow preform is prepared using hollow die punching, followed by process of heat treatment, proof-machining and stress relieving.

DETAILED DESCRIPTION OF THE INVENTION

The present invention is applicable to manufacture any hollow shaft component that are used in variety of industries, particularly those required in wind energy industry and other industries where high power transmission gear boxes are in use. The present description is provided on the basis of the hollow shafts being used in the wind energy industry.

Figure 1:
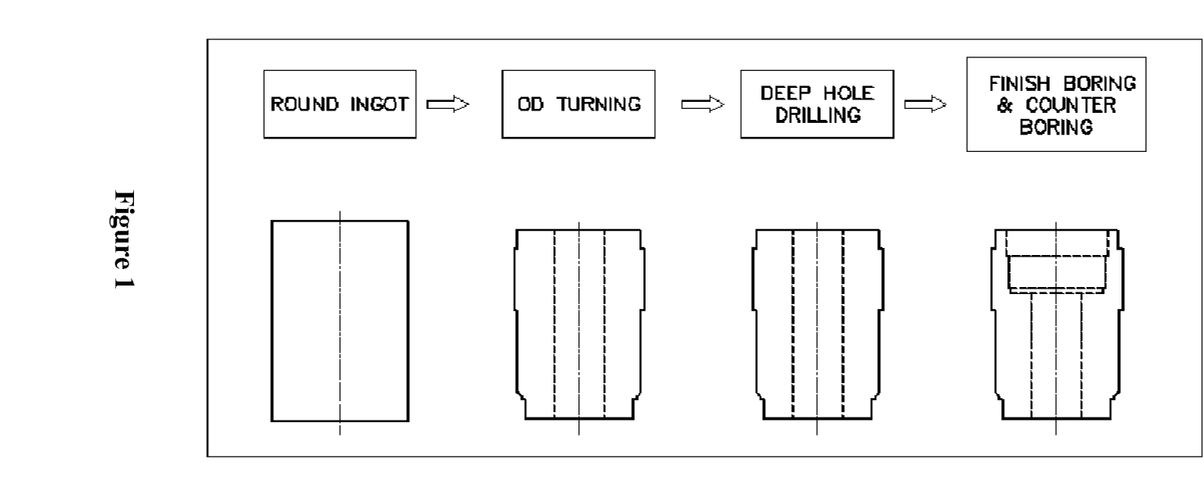
FIG. 1 shows a flow diagram for a typical conventional process of hollow shaft manufacture.

It is evident from the flow chart shown in FIG. 1 that the existing processes of hollow shaft manufacturing typically involve the following steps:
Providing a cast ingot or concast bloom (1), typically round in shape
Carrying out OD turning, finishing, and facing
Carrying out deep hole drilling
Boring and counter boring to provide a central bore (2)
Providing heat treatment
Carrying out final machining It is evident from FIG. 1 that in order to achieve the final shape of the hollow shaft, a central bore (2) is made through the length of the work-piece. This results in cutting across the natural grain flow of the forged work-piece, which is detrimental to the material strength. As discussed in the background section, it has been noted that the current hollow shaft manufacturing processes do not deploy near-net-shape forging techniques in the manufacturing process, which consequently means that these processes do not result in recognizable grain structure in the components. Though these components typically meet the strength and other mechanical requirements, the additional factors of safety required in high stake applications are often difficult to achieve with any consistency.

Figure 2A:
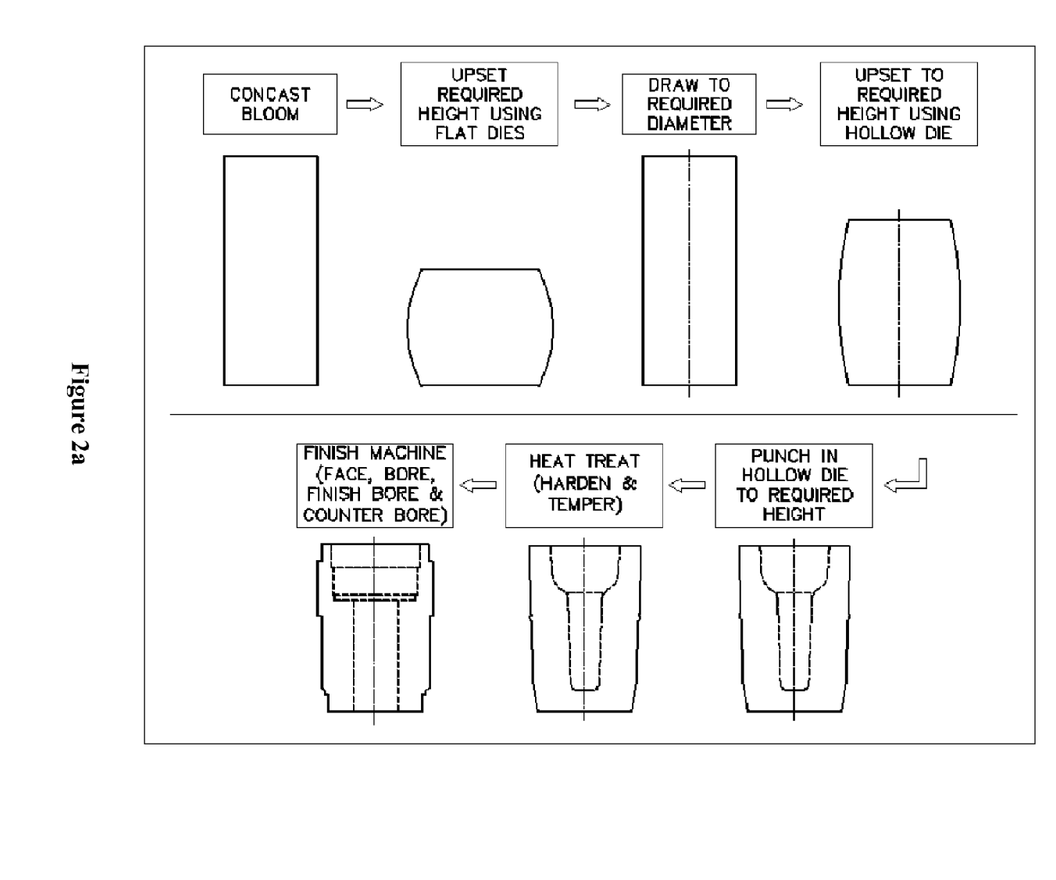
FIG. 2a shows the flow diagram for the process of the present invention used for rectangular shaped concast blooms.
Figure 2B:
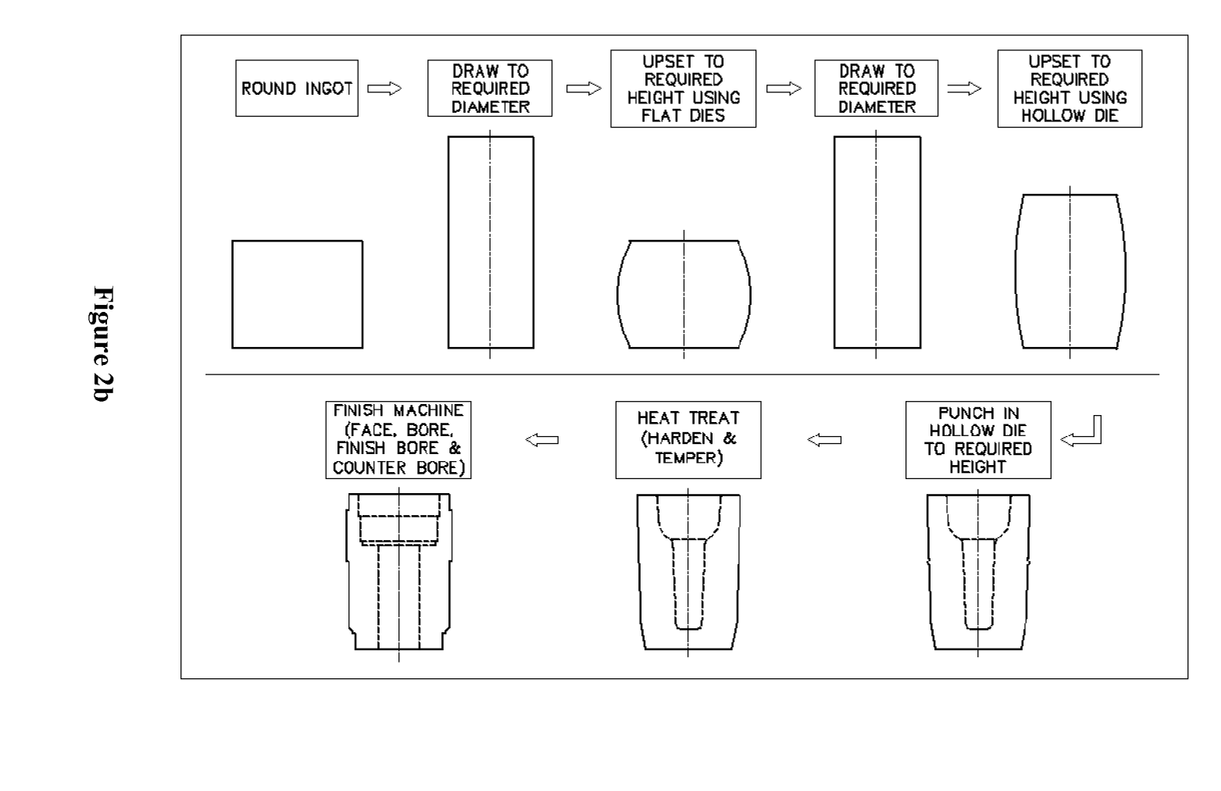
FIG. 2b shows the flow diagram for the process of the present invention used for as-cast round ingots.
Figure 2C:
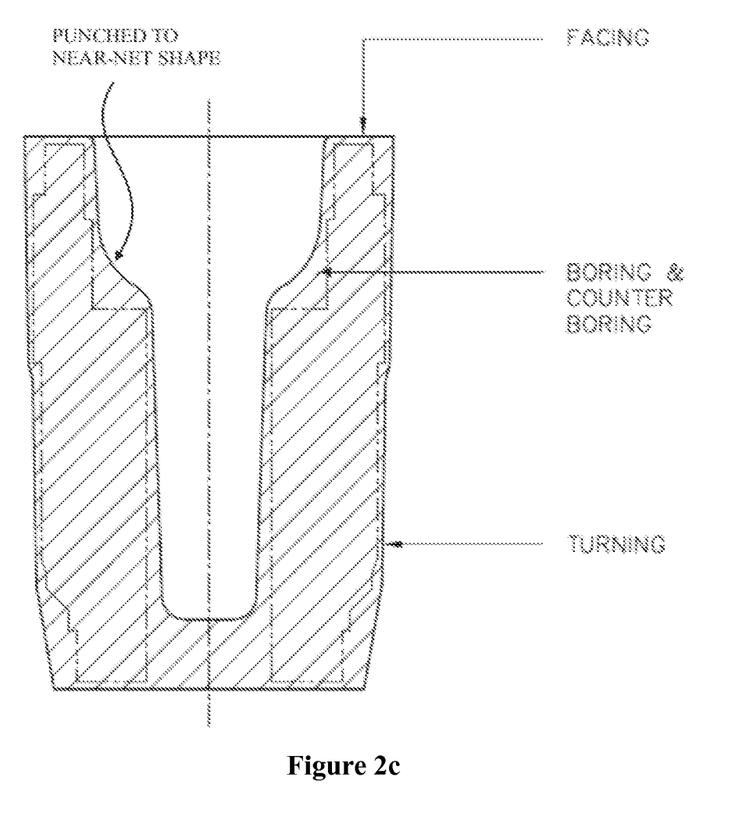
FIG. 2c shows the near-net shaped shaft after using the punch.

FIGS. 2a, 2b and 2c show flow diagrams of the process of the present invention to make hollow shafts. The process of the present invention begins with providing a concast bloom or an as-cast round ingot (1) with specified reduction ratios. The reduction ratios should be greater than three for round ingots and greater than five for concast blooms. This is in order to comply with the requirements of microscopic and macroscopic cleanliness, fineness of the grain size, mechanical properties.

The process of the present invention comprises the following steps:
Providing an concast bloom (input object) of rectangular cross section
Heating in a furnace
Upsetting to an intermediate height
Drawing to an intermediate diameter
Providing booster heating
Upsetting in a hollow die to the final height of the preform
Punching in a hollow die to produce a near-net shaped hollow shaft (3)
Providing heat treatment to carry out normalising, hardening and double tempering
Proof-machining (OD turning, finishing, and facing; boring and counter boring) to produce the final shaped hollow shaft (4)
Stress-relieving In the case where the concast bloom or ingot is round in cross section, the process of the present invention comprises the following steps:
Providing a concast bloom or an as-cast ingot (input object) of round cross section (1)
Heating in a furnace
Drawing to an intermediate diameter
Upsetting to an intermediate height
Providing booster heating
Drawing to the diameter achieved after the previous drawing step
Providing booster heating if required
Upsetting in a hollow die to the final height of the preform
Punching in a hollow die to produce a near-net shaped hollow shaft (3)
Providing heat treatment to carry out the steps of normalising, hardening and tempering Proof-machining (OD turning, finishing, and facing; boring and counter boring) to produce final shaped hollow shaft (4)

Stress-relieving

The following advantages of the process of the present invention over the existing methods are observed:
1. The weight of the input object right at the start of the process is reduced significantly compared to that used in a conventional process.
2. The time of machining is reduced (in comparison with an existing process) by approximately 40-45%.
3. The grain flow of the final product resulting from the process of the invention is much improved compared to the existing manufacturing processes. This results in better micro-structure and mechanical properties.
4. The factors of safety in the form of strength and mechanical properties of the products are much higher and consistent across the products than those for existing processes, which are required in high stake applications, and which are often difficult to achieve with any consistency in the case of existing processes.

With an iterative simulation approach, numerous manufacturing concepts for near-net shape forging were evaluated to optimize the near-net shape geometry, and manufacturing process using Virtual manufacturing techniques. Forging process was also optimized using 3D metal flow simulation and machining process was optimized using CAM simulation. Based on the results of the simulation, an optimal manufacturing methodology was developed for manufacturing components such as hollow shafts used in applications, for example, such as gear boxes for wind energy.

It is important to understand the significance of the optimisation of the near-net shape. Many near net shapes are possible as a starting point for producing a given component. However, the final shape of the component and the tool type and size may make many of the near-net shapes virtually impossible to use. Therefore the optimisation of the near net shape seeks to arrive at that near-net shape which will provide least wastage of material and also achieve quickest machining while arriving at the final component. The present process incorporates the step of such optimisation of the near net shape through forging.

Figure 3:
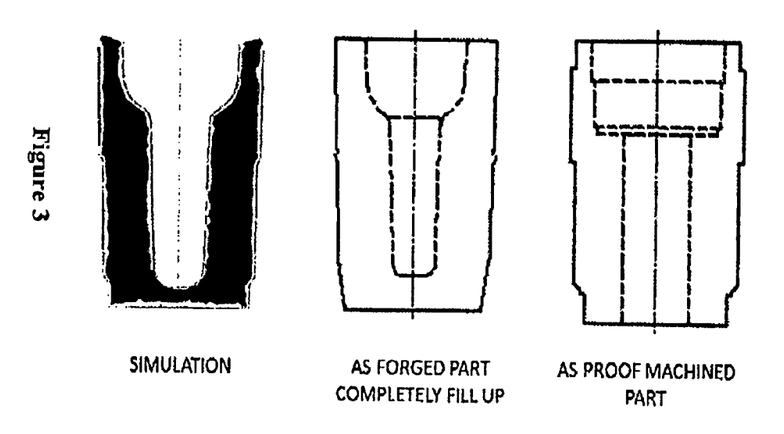
FIG. 3 shows the simulated, forged, and proof-machined stages of the hollow shaft manufactured using the process of the present invention.

Another key aspect of the present invention is that the near-net shape forging process is designed using a combination of upsetting and drawing using flat dies, and further upsetting and punching using hollow dies to provide a near-net shaped input to proof machining FIG. 3 shows the simulated, forged, and proof-machined stages of the hollow shaft manufactured using the process of the present invention.

It is to be noted that, in the process of the present invention, the near-net shape forging is being performed by any suitable forging equipment, for example, a hydraulic press. The resultant component is heat treated to achieve the required micro-structure and mechanical properties.

The heat treated component is proof-machined using suitable machining equipment and followed by stress relieving Stress relieving process helps to eliminate the stresses induced during proof machining.

The key advantages of the present invention are as follows,
1. Input weight was reduced about 30% using either rectangular cross section billet or circular cross section billet.
2. Productivity of manufacturing was improved substantially
3. Machining time was reduced by 41%.

It is therefore evident from the foregoing discussion that the present invention comprises the following embodiments.
1. A method for manufacturing hollow shafts from an input object for use in the gearboxes of wind-energy applications characterised in that said method comprises the steps of optimisation of the near net shape through forging followed by proof machining and stress relieving, said input object is a concast bloom or an ingot.
2. A method for manufacturing hollow shafts as described in embodiment 1 wherein in the case said concast bloom or ingot is in round or polygonal in cross section, characterised in that the said step of optimising the near net shape comprises the steps of:
   a. heating said bloom or ingot in a furnace
   b. first upsetting said bloom or ingot to an intermediate height
   c. drawing the upset bloom or ingot to an intermediate diameter
   d. providing booster heating to the drawn bloom or ingot
   e. Second upsetting the booster-heated bloom or ingot in a hollow die to the final height of the perform.
   f. punching the second upset bloom or ingot in a hollow die
   g. providing heat treatment to the punched bloom or ingot to carry out normalising, hardening and double tempering so as to produce a near net shaped hollow shaft.
3. A method for manufacturing hollow shafts as described in embodiment 1 wherein in the case said concast bloom or ingot is in substantially rectangular in cross section, the said step of optimising the near net shape comprises the steps of:
   a. heating said bloom or ingot in a furnace
   b. first upsetting the heated ingot or bloom to an intermediate height
   c. drawing the first upset bloom or ingot to an intermediate diameter
   d. providing booster heating to the drawn bloom or ingot
   e. second upsetting in the booster-heated bloom or ingot in a hollow die to the final height of the preform
   f. punching the second upset bloom or ingot in a hollow die so as to produce a near net shaped hollow shaft.
4. A hollow shaft manufactured from a bloom or an ingot as described in embodiments 1 to 3 in which the optimisation to a near-net shape is carried out by using a hollow die and a punch, by providing a rough machining and stress relief treatment to said near-net shape.
5. A hollow shaft as described in embodiment 4 wherein said hollow shaft has been manufactured starting with a concast bloom or an ingot which is round or polygonal in cross section.
6. A hollow shaft as described in embodiment 5 wherein said hollow shaft has been manufactured starting with a concast bloom or an ingot which is substantially rectangular in cross section.
7. A hollow shaft as claimed in claims 5 and 6 wherein said shaft has bores of multiple diameter.

While the above description contains much specificity, these should not be construed as limitation in the scope of the invention, but rather as an exemplification of the preferred embodiments thereof. It must be realized that modifications and variations are possible based on the disclosure given above without departing from the spirit and scope of the invention. Accordingly, the scope of the invention should be determined not by the embodiments illustrated, but by the appended claims and their legal equivalents.

The invention claimed is:

1. A method for manufacturing hollow shafts from an input object for use in the gearboxes of wind-energy applications characterised in that said method comprises the steps of optimisation of the near net shape through forging followed by proof machining and stress relieving, said input object is a concast bloom or an ingot which is round or polygonal in cross section, wherein said step of optimising the near net shape comprises the steps of:
   a. heating said bloom or ingot in a furnace;
   b. using flat dies, first drawing the bloom or ingot to an intermediate diameter;
   c. using flat dies, first upsetting said first drawn bloom or ingot to an intermediate height;
   d. providing booster heating to the first upsetted bloom or ingot;
   e. using flat dies, second drawing the first upset bloom or ingot to an required diameter;
   f. providing booster heating to the second drawn bloom or ingot if required;
   g. second upsetting the booster-heated bloom or ingot in a hollow die to the final height of the preform;
   h. punching the second upset bloom or ingot in a hollow die; and
   i. providing heat treatment to the punched bloom or ingot to carry out normalising, hardening and double tempering so as to produce a near net shaped hollow shaft.

2. A method for manufacturing hollow shafts as claimed in claim 1 wherein in the case said concast bloom or ingot which is substantially rectangular in cross section, the said step of optimising the near net shape comprises the steps of:
   a. heating said bloom or ingot in a furnace;
   b. using flat dies, first upsetting the heated bloom or ingot to an intermediate height;
   c. using flat dies, drawing the first upset bloom or ingot to an intermediate diameter;
   d. providing booster heating to the drawn bloom or ingot;
   e. second upsetting the booster-heated bloom or ingot in a hollow die to the final height of the preform;
   f. punching the second upset bloom or ingot in a hollow die; and
   g. providing heat treatment to the punched bloom or ingot to carry out normalising, hardening and double tempering so as to produce a near net shaped hollow shaft.

3. A method for manufacturing hollow shafts as claimed in claim 1 characterised in that the optimisation to a near-net shape is carried out by using a hollow die and a punch further followed by providing a rough machining and stress relief treatment to said near-net shape, wherein said hollow shaft has continuous grain flow lines.

4. A method for manufacturing hollow shafts as claimed in claim 3 wherein said hollow shaft has been manufactured starting with a concast bloom or an ingot which is round or polygonal in cross section.

5. A method for manufacturing hollow shafts as claimed in claim 4 wherein said hollow shaft has been manufactured starting with a concast bloom or an ingot which is substantially rectangular in cross section.

6. A method for manufacturing hollow shafts as claimed in claim 4 wherein said shaft has bores of multiple diameter.

7. A method for manufacturing hollow shafts as claimed in claim 2 characterised in that the optimisation to a near-net shape is carried out by using a hollow die and a punch further followed by providing a rough machining and stress relief treatment to said near-net shape, wherein said hollow shaft has continuous grain flow lines.

8. A method for manufacturing hollow shafts as claimed in claim 5 wherein said shaft has bores of multiple diameter.

9. A method for manufacturing hollow shafts as claimed in claim 7 wherein said shaft has bores of multiple diameter.

* * * * *